Patented Oct. 28, 1952

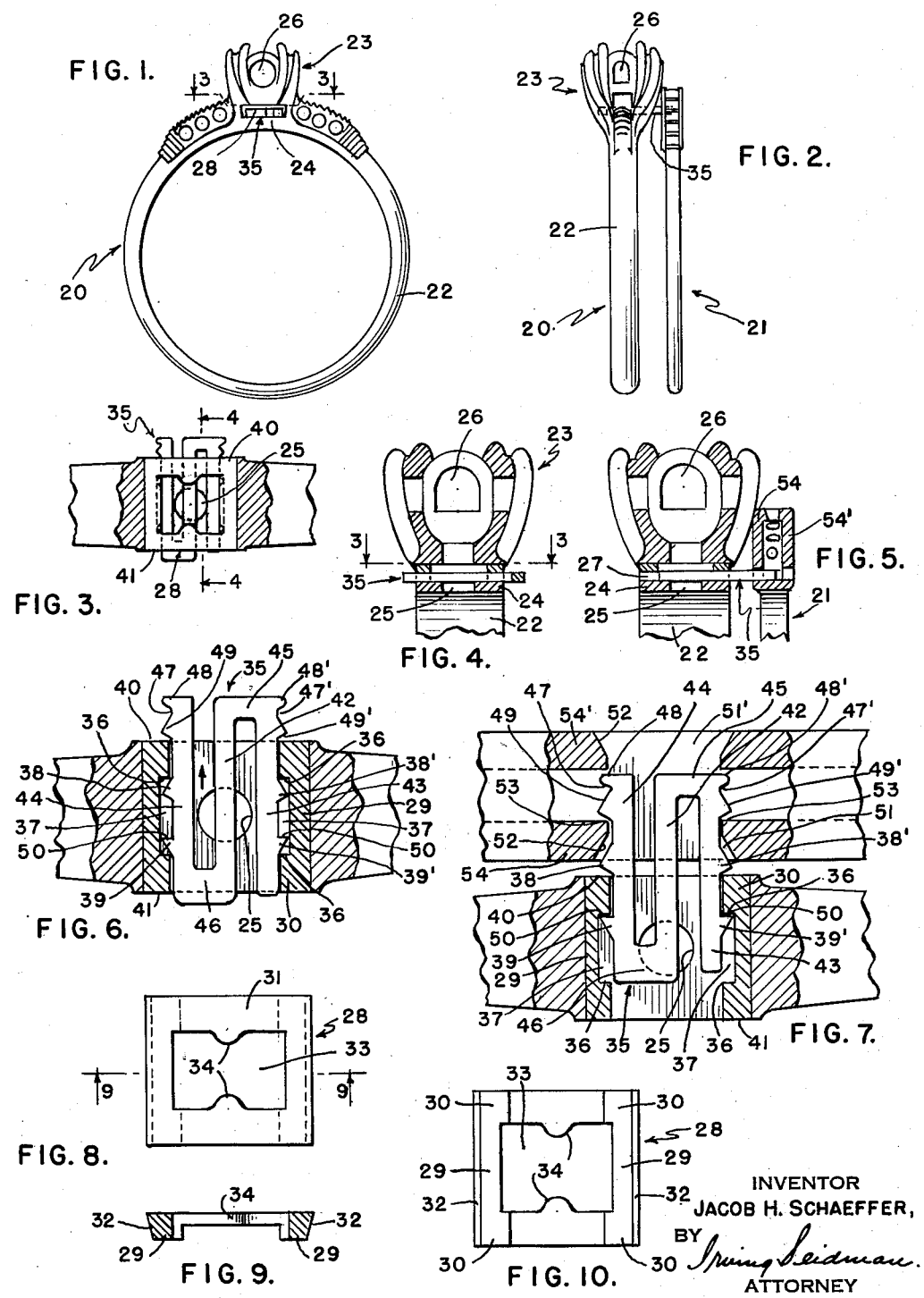

2,615,313

UNITED STATES PATENT OFFICE 2,615,313

WEDDING AND ENGAGEMENT RING ENSEMBLE AND COUPLING FOR SAME

Jacob H. Schaeffer, Great Neck, N. Y., assignor to Shiman Bros. Co., Inc., New York, N. Y., a corporation Application February 16, 1952, Serial No. 271,891

1 Claim. (Cl. 63—15)

This invention relates to improvements in engagement and wedding ring ensembles, and particularly to the novel means for holding both rings together so that such rings do not rotate with respect to one another.

This invention is an improvement over my application for a similar invention filed on August 14, 1948, under serial No. 44,348.

Broadly, it is an object of the invention to provide a retractable member which is lodged within one of the rings of the ensemble and which can be projected or extended from the ring within which it is lodged to hold the other ring of the ensemble together.

More particularly, it is an object of the invention to provide a retractable member in one of the rings having sufficient resiliency to hold the other ring of the ensemble when operatively associated, which will not detract from the appearance of the ring and which projects sufficiently at both ends beyond the opposed facings of the ring when in retracted position to permit the retractable member to be pushed inwardly with the finger nail at one end so that it will extend or project to a greater extent from the opposite facing in order to permit the retractable member to be grasped by opposed outer notches with the finger nails of one hand to draw it out to its extended position.

A further object is to provide opposed stops at the outer edges of the retractable member to prevent it from being readily removed from the channel of the ring (except with a tool) so that it will not easily be lost.

Still another object is to provide a pair of opposed stabilizer fins or flanges to prevent displacement or vertical movement of the retractable member.

A further object is to provide the other ring of the ensemble with outwardly tapered opposed openings in order to more readily compress the end of the retractable member and guide it into such opening to hold the two rings together.

For a fuller understanding of the nature and objects of the invention, reference is had to the following details of description in connection with the accompanying drawings, in which:

Fig. 1 is a side elevational view of an engagement ring showing the retractable member lodged within the channel.

Fig. 2 is an end elevational view of the engagement ring of Fig. 1 in operatively associated relation with the wedding ring of the ensemble.

Fig. 3 is an enlarged sectional view taken through line 3—3 of Fig. 1 showing the retractable member within the channel.

Fig. 4 is an enlarged sectional view taken through line 4—4 of Fig. 3, showing the upper part only.

Fig. 5 is an enlarged sectional view taken transversely through the ensemble shown in Fig. 2, showing the retractable member projected into the wedding ring to hold the two rings against relative rotation.

Fig. 6 is a fragmentary enlarged sectional view taken just above the retractable member with the retractable member in its retracted position.

Fig. 7 is a fragmentary enlarged sectional view taken just above the retractable member with the retractable member projected into the wedding ring holding the engagement and wedding rings together against relative rotation.

Fig. 8 is an enlarged top view of the stabilizer plate.

Fig. 9 is a sectional view taken through line 9—9 of Fig. 8.

Fig. 10 is a bottom view of the stabilizer plate shown in Fig. 8.

Referring to the drawing, numeral 20 represents the engagement ring and numeral 21 the wedding ring of the ring ensemble. Both rings may be made in numerous designs. However, the design of the engagement and wedding rings of the ensemble should be harmonious. Ring 20 has a shank 22 and a gem setting unit 23 for receiving the stone. The base 24 of the gem setting unit 23 has a central opening 25 and the opposed sides have openings or channels 26 to permit the passage of light to and through the stone within the setting.

The gem setting unit 23 has a horizontal channel 27 extending transversely through the setting 23 just above the base 24. Channel 24 is created by inserting a stabilizer plate 28 into an enlarged transverse opening or channel above base 24, as shown in Fig. 1.

Stabilizer plate 28 has a top 31 and a pair of opposed parallel downwardly projecting skids 29 with a right angle inwardly projecting opposed terminals 30 forming the front and rear ends of the skids 29. The outer sides 32 of skids 29 are tapered downwardly at the same angle as the side walls of the enlarged transverse opening and the plate 28 is adapted to fit snugly into the enlarged transverse opening above the base 24. The top 31 has a central opening 33 and two opposed inwardly projecting fins 34 flush with the top 31 for the purpose hereinafter described. The distance between the opposed front and rear terminals 30 is the same.

In practice, the stabilizer plate 28 is inserted into the enlarged transverse opening above base 24 with the skids 29 in downward position and soldered in place. A special tool is used to clean the angularly directed walls of the setting unit 23 and the horizonal channel 27 is filed or reamed to an accurate measurement with a specially made file or reamer thus making a clean and accurate passage or channel for a retractable member 35, as hereinafter described. When the ring is polished it is impossible to see the outlines of the stabilizer plate.

Channel 27 is thus defined by the underneath face of the top 31, the upper face of the base 24 and the inner walls of the skids and terminals 29 and 30, respectively. It should be noted that the terminals 30 provide inner opposed shoulders 36 (for the purpose as hereinafter described) and vertical opposed channels 37 to house the opposed central ridges 38, 38' and the opposed rear stops 39, 39' of the retractable member 35. The inner faces of the skids 29 between the terminals 30 are parallel providing a wide central space within the channel 27. Since the channel 27 is very small both in width and height and is almost completely filled by the retractable member 35, it is hardly visible and the portions of the retractable member extending beyond the opposed facings of the ring 20 appear to be part of the design of the ring and in no way detracts from the general design and appearance of it.

The retractable member 35 comprises a flat resilient S-shaped unit of a thickness to move easily within the horizontal channel 27. Member 35, when in its retracted position, as shown in Figs. 3, 4 and 6, projects or extends beyond both the front facing 40 and the opposed rear facing 41 of ring 20 for the purpose hereinafter described. The member 35 has a central bar 42, outer bars 43, 44 connected to the central bar 42 by transverse portions 45, 46 at opposite ends providing resiliency to the outer bars 43, 44. The front protruding end of the S-member 35 is provided with opposed notches 47, 47' which are formed between the rounded end ridges 48, 48' and front ridges 49, 49'. It should be noted that the angle of ridges 49, 49' and 38, 38' toward the front facing 40 is greater than that toward the rear facing 41. The S-member 35 is projected towards the front facing 40 by finger nail pressure upon the outer protruding edge of the transverse bar 46. Since the front angle of the central ridges 38, 38' is large (about 158°) and bars 43, 44 are resilient, it does not require much force to cause the ridges to override the shoulders 36. A slight forward movement of the S-member will permit one to easily place the finger nails of the thumb and middle finger in the opposed notches 47, 47' of the S-member 35 and draw it outwardly until the right angle front edges 50 of rear stops 39 abut the inner shoulders 36, 36'. The space between central ridges 38, 38' and rear stops 39, 39' is the same as the length of the terminals 30 so that when the S-member is in its projected or extended position it is firmly seated. By extending the transverse bar 46 beyond the rear facing 41 no tool or sharp pin is necessary to project the S-member outwardly. Any such tool would scratch and mar the finish of the S-member and in all probability the ring facing because it would be difficult to direct the point of the tool against the S-member due to its extremely small size.

When the S-member 35 is in its extended or projected position, as shown in Figs. 2, 5, and 6, it may be readily attached to the wedding ring 21 which has a pair of opposed openings 51, 51' in the opposed walls of the upper ornamental portion of the ring. Openings 51, 51' are centrally spaced with respect to the ornamental portion of the ring and spaced the same distance from the inside circumference of the ring as the channel 27 of the other ring of the ensemble so that both rings will be properly aligned and held against relative rotation when thus joined by the S-member.

The openings 51, 51' are tapered at their outer ends, as shown at 52 which directs and aids the rounded ends of the end ridges 48, 48' to enter the opening 51, or 51' acting as a camming surface to bring the bars 43, 44 towards each other and as the front ridges 49, 49' pass the inner corners 53 of the double walled upper portion of the ring 21 the corners 53 will slide down the rear incline of the front ridges 49, 49' and settle into fixed position with a click thus holding the rings against relative rotation and in firm and detachable position. The front end portion of the S-member between the front ridges 49, 49' and the front end will be housed between the walls 54, 54' of the wedding ring.

The central opening 25 and the side openings or channels 26 permit sufficient light to pass or be reflected by or through the stone whether the S-member is in its retracted or extended positions.

The two rings of the ensemble can be readily separated by placing the finger nails of the thumbs between the rings and prying them apart, or the rings may be pulled apart by the fingers of both hands. Since it is easier to grasp the two rings with both hands and exert greater pressure in pulling them apart and in pushing the S-member to its retracted position than in pushing the S-member to its projected position, the rear angles of the front and central ridges 49, 49' and 38, 38' can be made smaller (about 112°) than the front angles. After the rings are separated the S-member is pushed into the ring 20 by finger pressure so that it takes the position shown in Figs. 3 and 6. During the action of moving the S-member from one position to another, the fins 34 prevent the S-member from any vertical movement or displacement.

It is obvious that certain changes and modifications may be made in the details of construction and arrangement of parts without departing from the general spirit of the invention.

I claim:

A finger ring having opposed facings, a shank and a gem setting, said gem setting having a base, a horizontal transverse channel above said base through said gem setting, a retractable S-shaped movable member in said channel, said member when in retracted position extending beyond said opposed facings, said member manually movable from a retracted inoperative position to an operative position extending substantially beyond the facing of one side of said ring, said member having rounded opposed terminals at the front end, front opposed ridges adjacent said terminals with notches therebetween permitting the finger nails of one hand to grasp said member to move it to its operative position, central opposed ridges for firmly positioning said member in its retracted or operative positions, and rear opposed stops having front edges at right angles to said member and sloping rear edges, said member resilient at both ends, said channel having opposed shoulders adjacent each end for retaining said member in operative and inoperative positions and preventing said member from being removed from said gem setting, said member adapted to engage a second finger ring when said member is in operative position to hold said second finger ring against relative rotation to said first finger ring.

JACOB H. SCHAEFFER.

REFERENCES CITED

The following references are of record in the file of this patent:

UNITED STATES PATENTS

| Number | Name | Date |
| --- | --- | --- |
| 2,571,674 | Braunstein | Oct. 16, 1951 |